(No Model.)
L. ANDERSON.
TOP PROP.
No. 394,549. Patented Dec. 18, 1888.
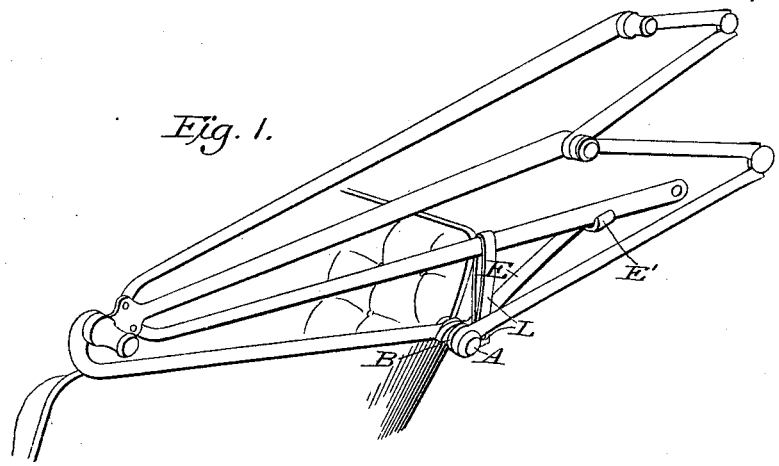
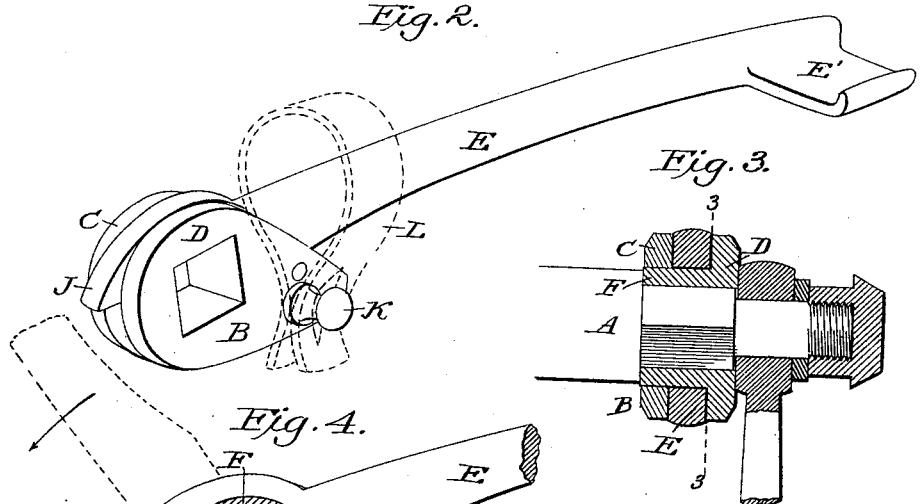
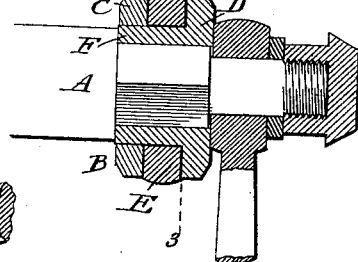
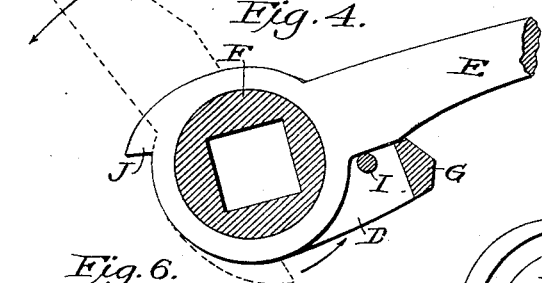
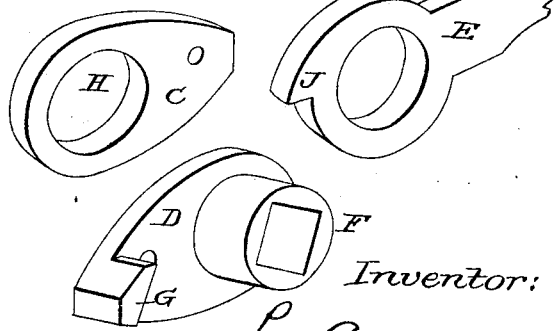
Witnesses:
James F. DuHamel
Horace A. Dodge
Inventor:
Lee Anderson
by Dodge Sons
Attys.

UNITED STATES PATENT OFFICE.

LEE ANDERSON, OF PARIS, TEXAS, ASSIGNOR OF TWO-THIRDS TO E. B. NORMENT AND J. L. TERRILL.

TOP-PROP.

SPECIFICATION forming part of Letters Patent No. 394,549, dated December 18, 1888.

Application filed September 28, 1888. Serial No. 286,637. (No model.)

*To all whom it may concern:*

Be it known that I, LEE ANDERSON, of Paris, in the county of Lamar and State of Texas, have invented certain new and useful Improvements in Top-Props, of which the following is a specification.

My invention relates to top-props for carriages; and it consists in a novel construction of the same, whereby the device is rendered simple, cheap, and strong.

In the drawings, Figure 1 is a perspective view showing my invention in use; Fig. 2, an enlarged perspective view of the prop; Fig. 3, a cross-sectional view through the stud to which the prop is secured; Fig. 4, a sectional view on the line 3 3; Fig. 5, a view of the parts separated, and Fig. 6 a view illustrating a slight modification.

A indicates an angular stud projecting from the side of the vehicle, and which is covered throughout the greater part of its length by leather or similar material, so as to afford a rest or support for the bows.

Fitting upon the angular end of the stud A is a block, B, comprising two plates, C and D, separated from each other a distance to receive the supporting-arm E. The plate D is provided at one end with a tubular hub, F, and at the other end with a lug or block, G, which latter keeps the plates C and D at proper distance apart. The end of the tubular hub F projects through a hole or opening, H, in the plate C, and the parts are secured together by means of a screw or bolt, I, as shown in Fig. 4.

The supporting-arm E is provided at one end with a laterally-extending arm or seat, E', to receive and support the bows of the carriage-top, while its other end is provided with a circular hole to fit upon the tubular hub F. When in this approximately-horizontal position and supporting the bows when the top is down, the arm rests near its pivotal point upon the lug G, as clearly shown in Fig. 4. When, however, the arm is thrown forward, as indicated in dotted lines in Fig. 4, to support the top in its upright position, a lug or stop, J, formed upon the lever or arm will come in contact with the screw or bolt I, which latter serves to limit the forward movement of the arm.

The block B is provided with a pin or button, K, to which the ends of a strap, L, (shown in dotted lines in Fig. 2,) are secured, the said strap passing around the arm E and around the bows of the carriage, thereby preventing said bows from jolting up and down.

Instead of making the block B of two pieces and fastening them together, as represented in Figs. 1 to 5, the said block may be made in a single casting and the lever or arm E made in two parts, as represented in Fig. 6.

I am aware that a top-prop has been devised in which the arm is made capable of swinging upon the pivot to a certain extent and connected to the bow by links, so as to swing up with it, and to such a plan I make no claim.

Having thus described my invention, what I claim is—

1. In a top-prop, the combination, with the stud A, of a block, B, secured thereon, and an arm, E, pivoted in the block and independent of the bows.

2. In a top-prop, the combination, with the plate D, provided with hub F and lug G, of plate C, provided with opening H, and an arm, E, mounted upon the hub.

3. In a top-prop, the combination of a block, a supporting-arm mounted thereon, and a strap passing about the arm and bows and secured to the block.

4. In combination with plate D, provided with tubular hub F and lug G, plate C, provided with an opening, H, to fit upon the hub, an arm, E, provided with a seat, E', and with a circular opening to fit upon the hub, and a bolt or screw, I, all arranged substantially as shown.

In witness whereof I hereunto set my hand in the presence of two witnesses.

LEE ANDERSON.

Witnesses:
I. D. SUTTER,
H. F. YIRMIN.